United States Patent
Bhalgat et al.

(10) Patent No.: US 11,222,366 B2
(45) Date of Patent: Jan. 11, 2022

(54) DETERMINING ACCURACY OF A MODEL DETERMINING A LIKELIHOOD OF A USER PERFORMING AN INFREQUENT ACTION AFTER PRESENTATION OF CONTENT

(71) Applicant: Facebook, Inc., Menlo Park, CA (US)

(72) Inventors: Anand Sumatilal Bhalgat, Mountain View, CA (US); Hao Song, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 934 days.

(21) Appl. No.: 15/299,330

(22) Filed: Oct. 20, 2016

(65) Prior Publication Data

US 2018/0114252 A1  Apr. 26, 2018

(51) Int. Cl.
 *G06Q 30/00* (2012.01)
 *G06Q 30/02* (2012.01)
 *G05B 19/418* (2006.01)

(52) U.S. Cl.
 CPC ..... *G06Q 30/0275* (2013.01); *G06Q 30/0254* (2013.01)

(58) Field of Classification Search
 CPC .................................. G06Q 30/0275
 See application file for complete search history.

(56) References Cited

U.S. PATENT DOCUMENTS

| | | | |
|---|---|---|---|
| 5,790,684 A | 8/1998 | Niino et al. | |
| 8,504,437 B1* | 8/2013 | Agarwal | G06Q 30/08 705/26.3 |
| 9,769,584 B1 | 9/2017 | Norris et al. | |
| 9,774,979 B1 | 9/2017 | Morishita et al. | |
| 2002/0165849 A1* | 11/2002 | Singh | G06Q 10/087 |
| 2006/0041472 A1* | 2/2006 | Lukose | G06Q 30/00 705/14.66 |
| 2013/0156202 A1 | 6/2013 | Hamacher | |
| 2014/0207564 A1* | 7/2014 | Dubey | G06Q 30/02 705/14.43 |
| 2016/0217781 A1 | 7/2016 | Zhong et al. | |

OTHER PUBLICATIONS

Online Content Trading: Sharing Mart System and Auction Experiments. IEEE. 2010. (Year: 2010).*

* cited by examiner

*Primary Examiner* — Maria V Vanderhorst
(74) *Attorney, Agent, or Firm* — Fenwick & West LLP (57) ABSTRACT

An online system selecting content items for presentation to its users accounts for likelihoods of users performing actions associated with content items when selecting content items. The online system maintains models determining likelihoods of users performing various actions. If a content item is associated with an action that infrequently occurs, information for determining the model for the action is limited, so the online system increases a bid amount associated with the content item during a time interval to an amount based on a likelihood of the user performing a more frequently occurring alternative action and an average bid amount for the alternative action from content items previously presented to users. The online system also determines an amount based on the model for the action and the bid amount for during the time interval and stops increasing the bid amount when the rate of change has less than a threshold magnitude.

20 Claims, 3 Drawing Sheets

DETERMINING ACCURACY OF A MODEL DETERMINING A LIKELIHOOD OF A USER PERFORMING AN INFREQUENT ACTION AFTER PRESENTATION OF CONTENT

BACKGROUND

This disclosure relates generally to online systems, and more specifically to selecting content to online system users based on actions by the users greater than a reasonable amount of time after presentation of the content.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow publishing users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the publishing user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

However, publishing users providing content items to an online system may benefit more from user actions occurring greater than a reasonable amount of time after content items were presented to online system users. For example, a publishing user provides an online system with a content item to entice users to interact with particular content accessed by a user after interacting with other content. Additionally, the publishing user may provide the online system with a content item to entice users to perform an infrequent action that is highly valuable to the publishing user. While conventional online systems often account for likelihoods of user interaction with content items when selecting content items, the conventional online systems merely account for likelihoods of interactions performed by users recently after presentation of content items, which may not accurately predict or account for actions by users greater than the reasonable amount of time after presentation of content or for actions that users infrequently perform. For example, conventional online systems may predict a likelihood of a user accessing a content item, but are unable to accurately predict a likelihood of the user accessing additional content that is reached by navigating through content presented after the user accesses the content item. Without accurately predicting likelihoods of users performing certain types of actions after being presented with a content item, conventional online systems are unable to effectively aid publishing users in specifying amounts of compensation for content items encouraging the certain types that improve a likelihood of the online system selecting those content items for presentation.

SUMMARY

An online system receives content items for presentation to one or more users of the online system. Some of the content items include targeting criteria specifying characteristics of users eligible to be presented with the content items. A content item including targeting criteria is eligible to be presented to users having characteristics satisfying at least a threshold amount of the targeting criteria. Additionally, some content items may be associated with bid amounts, where a bid amount associated with a content item specifies an amount of compensation received by the online system from a publishing user associated with the content item in exchange for presenting the content items to one or more users.

To encourage online system users to perform various actions after being presented with a content item, a publishing user providing the content item to the online system associates an action and a bid amount with the content item. The bid amount specifies an amount of compensation the publishing user provides to the online system in response to a user performing the action after being presented with the content item. For example, a publishing user associates a content item with an action of a user accessing a specific page of content that is accessible after the user accesses other content associated with the content item and an amount of compensation the publishing user provides the online system if a user accesses the specific page of content after being presented with the content item.

When selecting content items for presentation to a user, the online system accounts for likelihoods of the user performing one or more actions after being presented with various content items. To determine a likelihood of the user performing an action after being presented with the content item, the online system maintains various models predicting the likelihood of the user performing the action in response to being presented with the content item based on characteristics of the user (e.g., prior actions performed by the user, characteristics of content items with which the user interacted, connections between the user and other users or objects, demographic information of the user, etc.) and characteristics of the content item (e.g., one or more topics associated with the content item, types of content included in the content item, etc.). Different models maintained by the online system predict likelihoods of the user performing different actions after being presented with the content item. When a content item is associated with an action and a bid amount indicating compensation received by the online system in response to the user performing the action, the online system obtains a model determining a likelihood of the user performing the action.

When content items include bid amounts specifying amounts of compensation the online system receives in exchange for a user presented with the content items performing actions associated with the content items after being presented with the content items, the online system determines expected values to the online system for presenting different content items to a user. The expected value to the online system for presenting a content item associated with an action is based on a likelihood of the user performing the action and the bid amount associated with the content item. For example, the expected value to the online system for presentation of a content item associated with a user accessing a page of content is a product of the bid amount associated with the content item and a likelihood of the user accessing the page of content after being presented with the content item. Hence, the models maintained by the online system allow the online system to determine an expected value to the online system for presenting a content item to a user by determining a likelihood of the user performing an action associated with the content item after being presented with the content item. In various embodiments, the online system includes content items in association with their expected values in one or more selection processes that select content for presentation to the user. For example, a selection process ranks content items based on their associated expected values and selects content items having at least a threshold position in the ranking for presentation to a user.

However, if a content item is associated with an action that infrequently occurs, a model maintained by the online system to determine a likelihood of the user performing the action may be based on a limited amount of data. For example, an action may occur less than a threshold number of times or with less than a threshold frequency to be an action occurring infrequently. In a specific example, the content item is associated with an action that is performable on a page that is accessible either indirectly or directly after selecting a link included in the content item. The limited number of times the action occurs limits the information the online system may use to train a model to determine a likelihood of the user performing the infrequently occurring action, which limits an accuracy of the likelihood determined by the model. This limited accuracy may prevent the online system from presenting content items associated with the infrequently occurring action to users who would be likely to perform the action.

To improve the model used to determine the likelihood of users performing the infrequently occurring action (also referred to as "the action") associated with a content item (e.g., the action performable on a page or other content that is accessible after a user selects a link included in the content item), the online system determines a set of users of the online system who are eligible to be presented with the content item. For example, if the content item associated with the action includes targeting criteria, the online system identifies set of users having characteristics that satisfy at least a threshold amount of the targeting criteria. If the content item does not include targeting criteria and was previously presented to users, the online system identifies a set of users having characteristics matching at least a threshold amount of characteristics common to users to whom the content item was previously presented.

Based on the set of users, the online system determines an average bid amount associated with content items previously presented to one or more users of the set of users specifying an amount of compensation provided to the online system in response to users performing an alternative action after being presented with the content items. The alternative action is an action that occurs more frequently than the action associated with the content item. For example, if the action is performable on a page that is accessible either indirectly or directly after selecting a link included in the content item, the alternative action is selecting the link included in the content item. In various embodiments, the alternative action occurs more recently after presentation of the content item than the action. For example, the alternative action is a user accessing (e.g., selecting) a content item or a link associated with a content item, while the action is the user interacting with particular content associated with the content item after interacting with other content associated with the content item or otherwise performing an action via content that is directly or indirectly accessible after selecting a link included in the content item (or otherwise interacting with the content item). In various embodiments, the online system determines the average bid amount by averaging bid amounts of content items associated with the alternative action that were presented to one or more users of the set within a threshold amount of time from a current time or that were presented to one or more users of the set during a particular time range. For example the online system averages bid amounts in response to users of the set selecting a link included in content items that were presented to users of the set within a threshold amount of time from the current time or that were presented to one or more users of the set during the particular time range. As the alternative action occurs more frequently, the online system has obtained more data from occurrences of the alternative action than from occurrences of the action, allowing the online system to maintain a model that more accurately determines a likelihood of users performing the alternative action.

To determine an accuracy of the model predicting the likelihood of users performing the action after being presented with the content item (e.g., performing an action that is performable on a page that is accessible either indirectly or directly after selecting a link included in the content item), during a time interval, the online system increases the bid amount associated with the content item based on the determined average bid amount in one or more selection processes for opportunities to present the content item to online system users. In some embodiments, online system starts the time interval when the online system receives a request from a publishing user who provided the content item to the online system. Alternatively, the online system starts the time interval in response to determining one or more criteria for presentation of the content item are satisfied. For example, the online system starts the time interval in response to determining the content item has been presented with less than a threshold frequency or in response to determining the content item has been presented less than a threshold number of times during a temporal range.

During the time interval, when the online system identifies an opportunity to present the content item to a user, the online system obtains the model determining a likelihood of the user performing the action associated with the content item after being presented with the content item and also obtains an additional model determining a likelihood of the user performing the alternative action after being presented with the content item. While the online system determines an expected value to the online system of presenting the content item based on the model and the bid amount associated with the content item, the online system also determines an additional expected value based on the additional model and the average bid amount. As described above, the online system stores various models determining likelihoods of users performing different actions after being presented with a content item, so the online system retrieves a stored model corresponding to the action and retrieves an additional stored model corresponding to the alternative action. For example, if the action associated with the content item is accessing content associated with the content item after accessing other content associated with the content item, during the time interval, the online system obtains a model determining a likelihood of the user accessing the content associated with the content item after accessing the additional content associated with the content item after being presented with the content item. In the preceding example, the online system also obtains an additional model determining a likelihood of the user accessing the content item (e.g., clicking on the content item) and determines an additional expected value to the online system based on the additional model and the average bid amount.

The online system includes the content item in association with the additional expected value in one or more selection processes selecting content for presentation via the identified opportunity. Associating the additional expected value with the content item in the one or more selection processes increases a likelihood of the one or more selection processes selecting the content item for presentation via the opportunity. This also increases a likelihood of the online system obtaining information about users who performed the action by increasing a number of opportunities for users to perform the action associated with the content item. Increasing presentation of the content item to users by using the additional expected value in the one or more selection processes allows the online system to evaluate performance of the model in affecting selection of the content item and to modify the model based on data received from users to whom the content item was presented via opportunities identified during the time interval. As the online system modifies the model, the online system subsequently determines the expected value to the online system of presenting the content item based on the modified model and the bid amount associated with the content item for other opportunities identified during the time interval. The online system determines a rate of change of the expected value to the online system determined from modifying the model during the time interval and the bid amount associated with the content item for various opportunities to present the content item identified during the time interval in which the content item was selected for presentation.

If a magnitude of the rate of change of the expected value to the online system of presenting the content item to users over time is less than a threshold value, the online system determines the model determining the likelihood of the user performing the action after being presented with the continent item has at least a threshold accuracy. Accordingly, the online system stops the time interval and provides one or more suggestions to a publishing user associated with the content item to modify the bid amount associated with the content item. For example, if the magnitude of the rate of change of the expected value to the online system of presenting the content item to users is zero for at least a threshold amount of time, the online system determines the rate of change of the expected value is constant, which indicates the model determining the likelihood of users performing the action associated with the content item after being presented with the content item has at least a threshold accuracy, making the model suitable for use when selecting content for users. If the online system determines the model is accurate, the online system provides one or more suggestions to the providing user who provided the content item to the online system. For example, the online system provides a suggestion to the providing user to increase the bid amount associated with the content item to increase a likelihood of the online system selecting the content item for subsequent presentation to users. A suggestion may include a recommended value for the bid amount or a percentage increase for the bid amount. After determining the model is accurate, suggestions provided by the online system to the providing user allow the providing user to more accurately modify the bid amount associated with the content item to increase the likelihood of the content item subsequently being selected by the online system.

However, if the online system determines to the rate of change of the expected value to the online system of presenting the content item to the user over time is negative, the online system determines the model has less than the threshold accuracy and continues modifying the model determining the likelihood of the user performing the action associated with the content item after being presented with the content item. For example, the online system modifies how different characteristics of users or characteristics of content items are weighted in the model. As another example, the online system modifies characteristics of users or characteristics of content items used by the model to determine the likelihood of the user performing the action associated with the content item. Using the increased bid amount for opportunities to present the content item during the time interval increases a likelihood of the content item being presented to users, which also increases a likelihood of the users performing the action.

BRIEF DESCRIPTION OF THE DRAWINGS

FIG. 2 is a block diagram of an online system, in accordance with an embodiment of.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
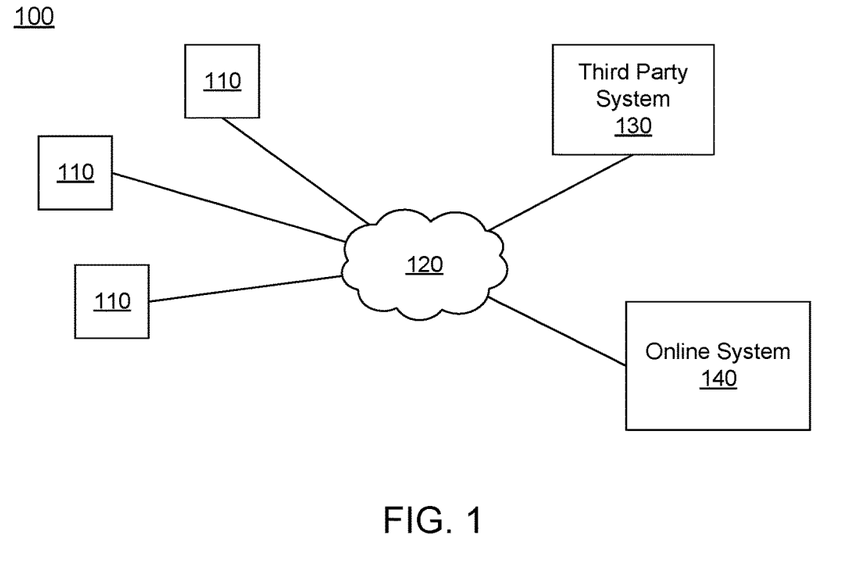
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 130 to notify users of the online system 140 of the content provided by the third party system 130. For example, a content item provided by the third party system 130 to the online system 140 identifies a page of content provided by the online system 140 that specifies a network address for obtaining the page of content. If the online system 140 presents the content item to a user who subsequently accesses the content item via a client device 110, the client device 110 obtains the page of content from the network address specified in the content item. This allows the user to more easily access the page of content.

Figure 2:
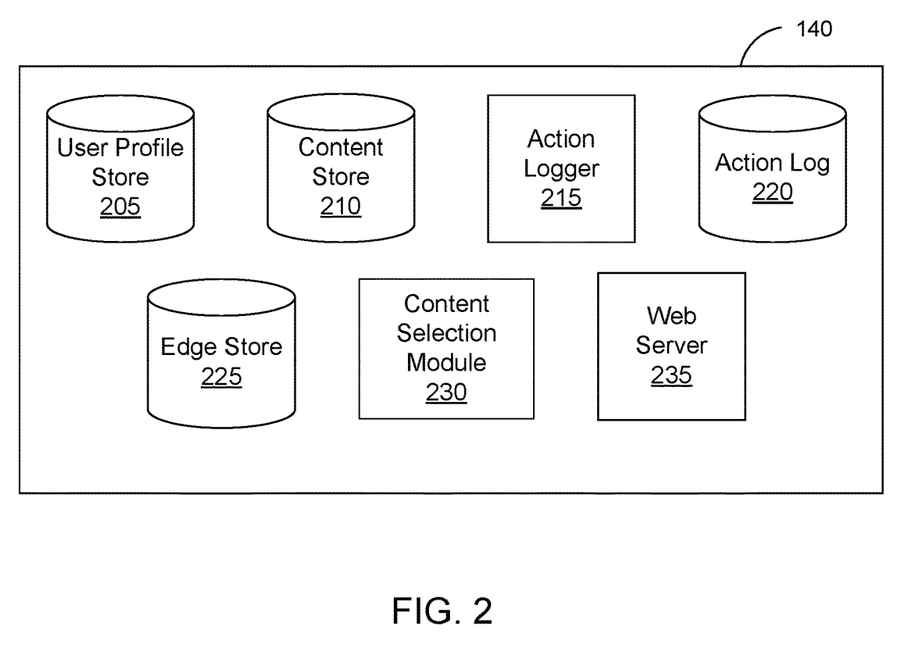

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. Additionally, a content item may include an objective that specifies an action that is performable on content, such as a page of content (or "page") that is accessible either indirectly or directly after selecting a link included in the content item. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

The content selection module 230 maintains various models that each determine a likelihood of a user performing one or more actions after being presented with a content item. Models maintained by the content selection module 230 determine likelihoods of a user performing an action after being presented with a content item based on characteristics of the user and characteristics of the content item. Example models maintained by the content selection module 230 determine a likelihood of a user accessing a content item presented to the user, determine a likelihood of the user performing a specific interaction with a content item presented to the user (e.g., expressing a preference for the content item, sharing the content item with another user, commenting on the content item), determine a likelihood of the user performing a specific interaction with an object (e.g., a page, a user, etc.) associated with a content item presented to the user, determine a likelihood of a user accessing other content associated with a content item presented to the user, or determine a likelihood of the user performing any suitable action after being presented with a content item. The content selection module 230 stores different models in association with actions for which the models determine likelihoods of occurring. Hence, to determine a likelihood of a user performing an action after being presented with a content item, the content selection module 230 determines the action, retrieves a stored model associated with the determined action, and applies the retrieved model to characteristics of the user and characteristics of the content item.

The content selection module 230 modifies the stored models based on characteristics of users who performed actions associated with stored models and characteristics of content items presented to users who performed the actions. This allows the stored models to become more accurate as users perform various actions after being presented with content items. However, certain action occur with less than a threshold frequency or less than a threshold number of times (also referred to herein as "infrequent actions"), limiting the information available to the content selection module 230 to modify or to update stored models associated with the infrequent actions. This may limit the accuracy of models associated with infrequent actions, which may subsequently impair selection of content items associated with infrequent actions by the content selection module 230, potentially decreasing revenue to the online system 140 from presenting content items associated with infrequent actions.

To evaluate a model determining a likelihood of a user performing an infrequent action after being presented with a content item, the content selection module 230 identifies an alternative action that occurs more frequently than the infrequent action and identifies a set of users eligible to be presented with the content item. For example, the infrequent action is an action that is performable on a page that is accessible either indirectly or directly after selecting a link included in a content item, while the alternative action is a user selecting the link included in the content item, which more frequently occurs. From content items previously presented to the set of users, the content selection module 230 determines an average bid amount for users presented with content items to perform the alternative action. For example, the content selection module 230 determines an average bid amount for content items presented to users who selected a link included in the content items. The content selection module 230 determines an expected value to the online system 140 of presenting the content item based on the bid amount associated with the content item and the model determining the likelihood of the user performing the action. Additionally, the content selection module 230 determines an additional expected value to the online system 140 of presenting the content item from an additional model determining a likelihood of the user preforming the alternative action after being presented with the content item and the average bid amount. For example, the additional model determines a likelihood of the user selecting a link included in the content item after being presented with the content item. The content selection module 230 includes the content item in association with the additional expected value in one or more selection processes for presentation to the user. As the additional expected value is likely larger than the expected value, associating the additional expected value with the content item in the one or more selection processes increases a likelihood of the content item being presented to the user, allowing the content selection module 230 to obtain additional information for the model determining the likelihood of the user performing the infrequent action by obtaining additional information when users presented with the content item perform the action.

Throughout the time interval, as users presented with the content item perform the action, the content selection module 230 receives information and modifies the model based on the received information. Further, as opportunities to present the content item to users of the online system 140 are identified, the content selection module 230 similarly determines the additional expected value using the modified model and the average bid amount and determines a rate of change of the expected value to the online system 140 determined from the model and the increased bid amounts associated with the content item for various opportunities where the content item was selected. If a magnitude of the rate of change of the expected value to the online system 140 of presenting the content item to users over time is less than a threshold value, the content selection module 230 determines the model determining the likelihood of the user performing the infrequent action has at least a threshold accuracy that is suitable for selecting content. Accordingly, the content selection module 230 stops the time interval and may provide one or more suggestions to a publishing user associated with the content item to modify the bid amount associated with the content item. For example, if the magnitude of the rate of change of the expected value to the online system 140 of presenting the content item to users is zero for at least a threshold amount of time, the content selection module 230 determines the rate of change of the expected value is constant, which indicates the model determining the likelihood of users performing the infrequent action has a sufficient accuracy to be used when selecting content.

However, if the content selection module 230 determines to the rate of change of the expected value to the online system 140 of presenting the content item to the user over time is negative for opportunities during the time interval where the content item was selected, the content selection module 230 determines the model has less than the threshold accuracy and subsequently modifies the model determining the likelihood of the user performing the infrequent action. Information obtained from presenting the content item to users via identified opportunities where the increased bid amount resulted in selection of the content item may be used by the content selection module 230 to modify the model. For example, the content selection modifies how different characteristics of users or characteristics of content items are weighted in the model. Evaluating a model predicting a likelihood of an infrequent action after presentation with a content item based on changes to the expected value to the online system 140 for presenting the content item is further described below in conjunction with FIGS. 3 and 4.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Determining Accuracy of a Model Determining Likelihood of User Action

Figure 3:
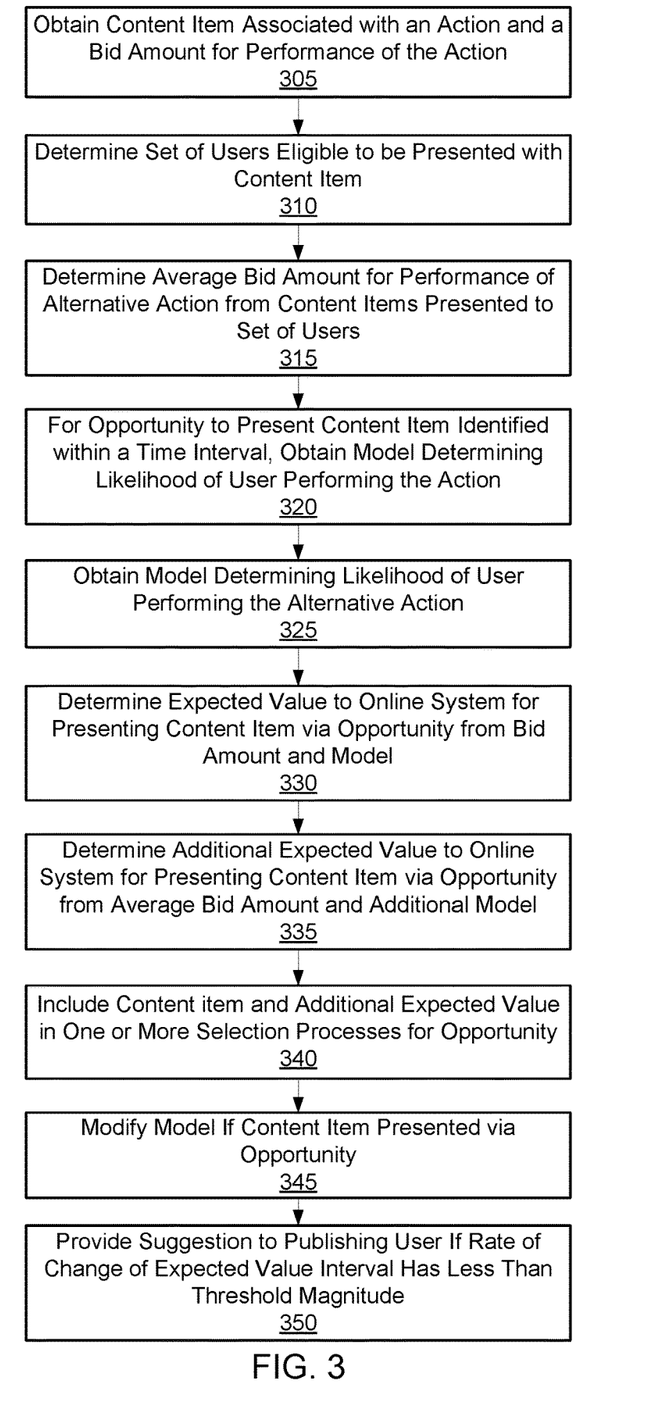
FIG. 3 is a flowchart of a method for determining an accuracy of a model used by an online system to determine a likelihood of users performing an action after being presented with a content item, in accordance with an embodiment.

FIG. 3 is a flowchart of one embodiment of a method for determining an accuracy of a model used by an online system 140 to determine a likelihood of users performing an action after being presented with a content item. In other embodiments, the method may include different and/or additional steps than those shown in FIG. 3. Additionally, steps of the method may be performed in different orders than the order described in conjunction with FIG. 3 in various embodiments.

An online system 140 receives various content items for presentation to one or more users of the online system 140. As further described above in conjunction with FIG. 2, content items may include targeting criteria specifying characteristics of users eligible to be presented with the content items. A content item including targeting criteria is eligible to be presented to users having characteristics satisfying at least a threshold amount of the targeting criteria. For example, a content item is eligible for presentation to a user having characteristics accessible to the online system 140 that satisfy at least a threshold number or at least a threshold percentage of targeting criteria included in the content item. Some content items may be associated with bid amounts, which are further described above in conjunction with FIG. 2. A bid amount associated with a content item specifies an amount of compensation received by the online system 140 from a publishing user associated with the content item in exchange for presenting the content items to one or more users.

To encourage online system users to perform various actions after being presented with a content item, a publishing user providing a content item to the online system 140 associates an action and a bid amount with the content item. The action associated with the content item identifies an action the publishing user desires users presented with the content item to perform after being presented with the content item. If an action is associated with a content item, the bid amount associated with the content item specifies an amount of compensation the publishing user provides to the online system 140 in response to a user performing the action after being presented with the content item. For example, a publishing user associates a content item with an action of accessing a specific page of content accessible after a user accesses other content associated with the content item and an amount of compensation the publishing user provides the online system 140 if a user accesses the specific page of content after being presented with the content item.

When selecting content items for presentation to a user, the online system 140 obtains 305 a content item associated with an action occurring subsequent to presentation of the content item and a bid amount specifying an amount of compensation received by the online system 140 in response to the action being performed after presentation of the content item. To select content for presentation to users, the online system 140 accounts for likelihoods of the user performing one or more actions after being presented with various content items. The online system 140 maintains various models each predicting a likelihood of a user performing an action in response to being presented with the content item based on characteristics of the user (e.g., prior actions performed by the user, characteristics of content items with which the user interacted, connections between the user and other users or objects, demographic information of the user, etc.) and characteristics of the content item (e.g., one or more topics associated with the content item, types of content included in the content item, etc.). Different models maintained by the online system predict likelihoods of the user performing different actions after being presented with a content item. In various embodiments, the online system 140 associates a model with an identifier of an action, allowing subsequent retrieval of a model for determining a likelihood of a user performing an action. When a content item is associated with an action and a bid amount indicating compensation received by the online system 140 in response to a user performing the action, the online system 140 obtains a model determining a likelihood of the user performing the action to evaluate whether to present the content item to the user.

If content items include bid amounts specifying amounts of compensation the online system 140 receives in exchange for a user presented with the content items performing actions associated with the content items after being presented with the content items, the online system 140 determines expected values to the online system for presenting different content items to a user when selecting content for presentation to the user. The expected value to the online system 140 for presenting a content item associated with an action is based on a likelihood of the user performing the action and the bid amount associated with the content item. For example, the expected value to the online system 140 of presenting a content item associated with an action to a user is a product of the bid amount associated with the content item and a likelihood of the user performing the action after being presented with the content item. Hence, the online system 140 retrieves a model corresponding to an action associated with a content item to determine a likelihood of a user performing the action associated with the content totem and determines an expected value to the online system 140 of presenting the content item based on the determined likelihood and the bid amount associated with the content item.

As described above in conjunction with FIG. 2, the online system 140 includes content items in one or more selection processes to select content for presentation to a user. One or more selection processes may select content items for presentation to the user based on expected values to the online system 140 for presenting various content items. For example, a selection process ranks content items based on their associated expected values and selects content items having at least a threshold position in the ranking for presentation to a user. In another example, a selection process selects content items having at least a threshold expected value.

However, if a content item is associated with an action that infrequently occurs, a model maintained by the online system 140 to determine a likelihood of the user performing the action may be based on a limited amount of data. An action occurring infrequently may be an action occurring less than a threshold number of times or occurring with less than a threshold frequency. In a specific example, the content item is associated with an action that is performable on a page that is accessible either indirectly or directly after selecting a link included in the content item. The limited amount of data on which the model is based when the action infrequently occurs limits an accuracy of the likelihood determined by the model. This limited accuracy may prevent the online system 140 from presenting content items associated with the infrequently occurring action to users who would be likely to perform the action. If the online system 140 receives compensation from a publishing user who provided the content item to the online system 140 when a user presented with the content item performs the action, the limited accuracy of the model predicting the likelihood of the user performing the action may reduce revenue obtained by the online system 140.

To improve the model used to determine the likelihood of users performing an infrequently occurring action (also referred to as "the action") associated with a content item (e.g., the action performable on a page or other content that is accessible after a user selects a link included in the content item), the online system 140 determines 310 a set of users of the online system 140 who are eligible to be presented with the content item. For example, if the content item associated with the action includes targeting criteria, the online system 140 identifies a set of users having characteristics that satisfy at least a threshold amount of the targeting criteria. As an example, the online system 140 determines 310 a set of users having characteristics accessible by the online system 140 that satisfy at least a threshold amount of targeting criteria included in the content item. If the content item does not include targeting criteria and was previously presented to users, the online system 140 determines 310 a set of users having characteristics matching at least a threshold amount of characteristics common to users to whom the content item was previously presented.

Based on the determined set of users, the online system 140 determines 315 an average bid amount associated with an alternative action associated with content items previously presented to one or more users of the set of users. The average bid amount is determined 315 from bid amounts associated with the alternative action and associated with content items presented to users of the determined set within a time duration. The alternative action is an action that occurs more frequently than the action associated with the content item. For example, if the action is performable on a page that is accessible either indirectly or directly after selecting a link included in the content item, the alternative action is selecting the link included in the content item. In various embodiments, the alternative action occurs more recently after presentation of the content item than the action associated with the content item. For example, the alternative action is a user accessing (e.g., selecting) a content item or a link included in the content item, while the action is the user interacting with particular content associated with the content item after interacting with other content presented after the user accesses the content item. In various embodiments, the online system 140 stores information identifying the alternative action. However, in other embodiments a providing user specifies the alternative action in the content item when providing the content item to the online system 140. In various embodiments, the online system 140 determines 315 the average bid amount by averaging bid amounts of content items associated with the alternative action that were presented to one or more users of the set within a threshold amount of time from a current time or that were presented to one or more users of the set during a particular time range. For example, the online system 140 averages bid amounts in response to users of the set selecting a link included in content items that were presented to users of the set within a threshold amount of time from the current time or that were presented to one or more users of the set during the particular time range. As the alternative action occurs more frequently, the online system 140 has obtained more data from occurrences of the alternative action than from occurrences of the action, allowing the online system 140 to maintain a model that more accurately determines a likelihood of users performing the alternative action than the model predicting the likelihood of users performing the action.

To determine an accuracy of the model predicting the likelihood of users performing the action after being presented with the content item (e.g., performing the action performable on a page or other content that is accessible after a user selects a link included in the content item), during a time interval, the online system 140 increases the bid amount associated with the content item based on the determined average bid amount in one or more selection processes for opportunities to present the content item to online system users. In some embodiments, online system 140 starts the time interval when the online system 140 receives a request from a publishing user who provided the content item to the online system 140. Alternatively, the online system 140 starts the time interval in response to determining one or more criteria for presentation of the content item are satisfied. For example, the online system 140 starts the time interval in response to determining the content item has been presented with less than a threshold frequency or in response to determining the content item has been presented less than a threshold number of times during a temporal range.

During the time interval, when the online system 140 identifies an opportunity to present the content item to a user of the online system 140, the online system 140 obtains 320 the model determining a likelihood of the user performing the action associated with the content item after being presented with the content item and also obtains 325 an additional model determining a likelihood of the user performing the alternative action after being presented with the content item. The alternative action occurs more frequently than the action associated with the content item. For example, the alternative action is accessing (e.g., clicking on) the content item or a link included in the content item, while the action associated with the content item is accessing content visible after accessing the content item. While the online system 140 determines 330 an expected value to the online system 140 of presenting the content item based on the model and the bid amount associated with the content item, the online system 140 also determines 335 an additional expected value based on the additional model and the average bid amount. As described above, the online system 140 stores various models determining likelihoods of users performing different actions after being presented with a content item, so the online system 140 retrieves a stored model corresponding to the action and retrieves an additional stored model corresponding to the alternative action. For example, if the action associated with the content item is accessing content associated with the content item after accessing other content associated with the content item, during the time interval, the online system 140 obtains 320 a model determining a likelihood of the user accessing the content associated with the content item after accessing the additional content associated with the content item after being presented with the content item. Based on the bid amount associated with the content item and the model, the online system 140 determines 330 an expected value to the online system 140; for example, the online system 140 determines 330 the expected value as a product of a likelihood from the model and the bid amount associated with the content item. In the preceding example, the online system 140 also obtains 325 an additional model determining a likelihood of the user accessing the content item (e.g., clicking on the content item, selecting a link included in the content item) and determines 335 an additional expected value to the online system 140 based on the additional model and the average bid amount. For example, the online system 140 obtains a likelihood of the user performing the action by applying the additional model to characteristics of the user and of the content item and determines 335 the additional expected value as a product of the likelihood and the average bid amount.

The online system 140 includes 340 the content item in association with the additional expected value in one or more selection processes selecting content for presentation via the identified opportunity. Associating the additional expected value with the content item in the one or more selection processes increases a likelihood of the one or more selection processes selecting the content item for presentation via the opportunity. This also increases a likelihood of the online system 140 obtaining information about users who performed the action by increasing a number of opportunities for users to perform the action associated with the content item. Increasing presentation of the content item to users by using the additional expected value in the one or more selection processes allows the online system 140 to evaluate performance of the model in affecting selection of the content item and to modify 345 the model based on data received from users to whom the content item was presented via opportunities identified during the time interval and who performed the action associated with the content item. As the online system 140 modifies the model and identifies other opportunities to present the content item to users during the time interval, the online system 140 subsequently determines 330 the expected value to the online system 140 of presenting the content item based on the modified model and the bid amount associated with the content item. The online system 140 determines a rate of change of the expected value to the online system 140 determined from modifying 345 the model during the time interval and the bid amount associated with the content item for various opportunities to present the content item identified during the time interval in which the content item was selected for presentation.

If a magnitude of the rate of change of the expected value to the online system 140 of presenting the content item to users over time is less than a threshold value, the online system 140 determines the model determining the likelihood of the user performing the action after being presented with the continent item has at least a threshold accuracy. Accordingly, the online system 140 stops the time interval and provides 350 one or more suggestions to a publishing user associated with the content item to modify the bid amount associated with the content item. For example, if the magnitude of the rate of change of the expected value to the online system 140 of presenting the content item to users is zero for at least a threshold amount of time, the online system 140 determines the rate of change of the expected value is constant, which indicates the model determining the likelihood of users performing the action associated with the content item after being presented with the content item has at least a threshold accuracy, making the model suitable for use when selecting content for users. If the online system 140 determines the model is accurate, the online system 140 provides one or more suggestions to the providing user who provided the content item to the online system 140. For example, the online system 140 provides 340 a suggestion to the providing user to increase the bid amount associated with the content item to increase a likelihood of the online system 140 selecting the content item for subsequent presentation to users. A suggestion may include a recommended value for the bid amount or a percentage increase for the bid amount. After determining the model is accurate, suggestions provided 340 by the online system 140 to the providing user allow the providing user to more accurately modify the bid amount associated with the content item to increase the likelihood of the content item subsequently being selected by the online system 140.

However, if the online system 140 determines to the rate of change of the expected value to the online system 140 of presenting the content item to the user over time is negative, the online system 140 determines the model has less than the threshold accuracy and subsequently modifies the model determining the likelihood of the user performing the action associated with the content item after being presented with the content item. For example, the online system 140 modifies how different characteristics of users or characteristics of content items are weighted in the model. As another example, the online system 140 modifies characteristics of users or characteristics of content items used by the model to determine the likelihood of the user performing the action associated with the content item. Using the increased bid amount for opportunities to present the content item during the time interval increases a likelihood of the content item being presented to users, which also increases a likelihood of the users performing the action. The online system 140 modifies the model based on information associated with occurrences of the action by users who were presented with the content item during the time interval to improve the accuracy of the model.

Figure 4:
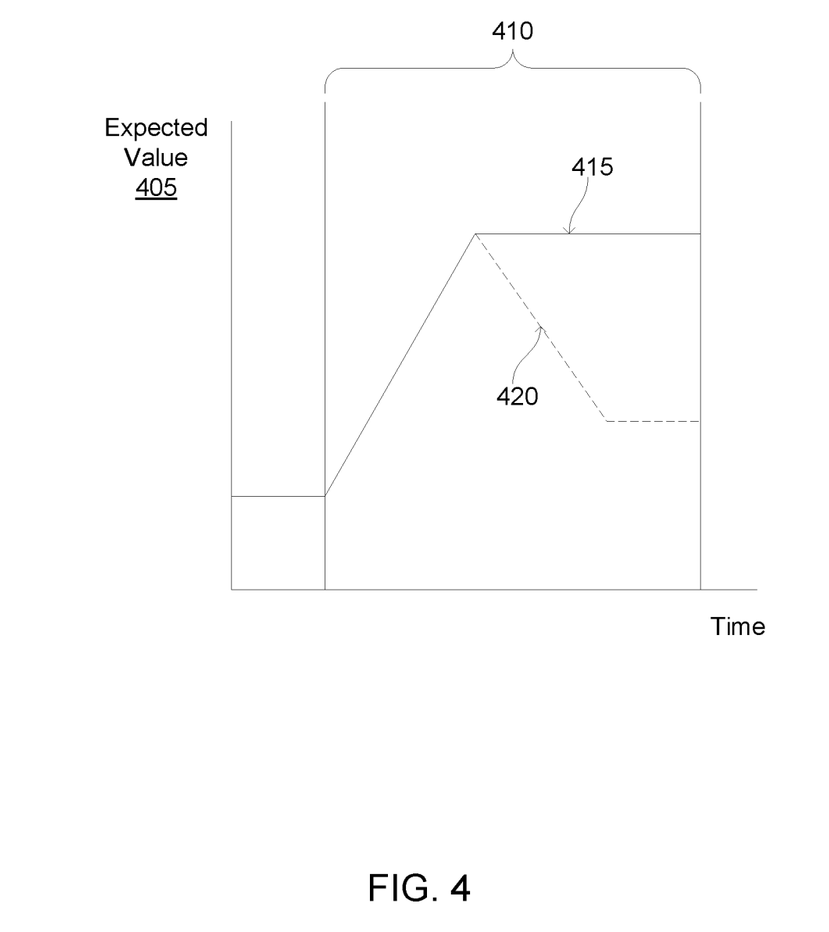
FIG. 4 is an example of an expected value to the online system of presenting a content item associated with an action over time as a bid amount of the content item is increased, in accordance with an embodiment.

FIG. 4 shows an example of the expected value 405 to the online system 140 of presenting a content item based on a bid amount associated with the content item and a model determining a likelihood of users performing an action associated with the content item. The example of FIG. 4 shows the expected value over time. During the time interval 410, the online system 140 determines an additional expected value to the online system based on an additional model determining a likelihood of the user performing an alternative action that occurs more frequently than the action associated with the content item and an average bid amount of other content items associated with the alternative action that were previously presented to the users. When selecting content for presentation via opportunities identified within the time interval 410, the online system 140 uses the additional expected value in selection processes, but also determines the expected value 405 based on the bid amount associated with the content item and the model determining the likelihood of users performing the action associated with the content item. The online system 140 modifies the model based on information obtained from users presented with the content item during the time interval, allowing the online system 140 to refine the model based on additional opportunities for users to perform the action. Additionally, as shown in FIG. 4, the online system 140 also determines the expected value 405 of presenting the content item to users corresponding to different opportunities to present content by applying the model to characteristics of the users and scaling the bid amount associated with the content item by a likelihood determined from the model. FIG. 4 shows expected values 405 to the online system 140 of presenting the content item when the content item was selected by the online system 140 are shown over time.

When a rate of change of the expected value 405 has less than a threshold magnitude, the online system 140 determines the model determining the likelihood of users performing the action has at least a threshold accuracy. For example, if the magnitude of the rate of change of the expected value is zero for at least a threshold amount of time, the online system 140 determines the model has at least the threshold accuracy and stops the time interval 410 where the bid amount associated with the content item is increased. In the example of FIG. 4, the rate of change of the expected value 415 is zero for the threshold amount of time, indicating the model has the threshold accuracy. However, if the online system 140 determines the rate of change of the expected value 405 is negative, the online system 140 determines the model has less than the threshold accuracy and subsequently modifies the model. FIG. 4 shows an example where an alternative rate of change 420 is negative during the time interval 410, which indicates the model is inaccurately predicting the likelihood of the user performing the action associated with the content item and impairing selection of the content item for presentation by the online system 140. After the time interval 410, the online system 140 modifies the model to subsequently increase the likelihood of the content item being selected for presentation.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
obtaining, at an online system comprising at least one hardware processor, a content item associated with a bid amount and with an action comprising an interaction with a page of content that is accessible after selection of a link included in the content item, the bid amount received by the online system in response to the action being performed;
determining, by the online system, a set of users of the online system eligible to be presented with the obtained content item;
determining, by the online system, an average bid amount in response to users selecting links included in other content items presented to users of the set of users by the online system, each of the other content items being associated with corresponding bid amounts;

for each opportunity to present the obtained content item to a user of the online system identified by the online system during a time interval:
  obtaining, by the online system, a model for determining a likelihood of the user performing the interaction with the page of content that is accessible after the user selects the link included in the obtained content item;
  obtaining, by the online system, an additional model for determining a likelihood of the user selecting the link included in the obtained content item;
  determining, by the online system, an expected value to the online system of presenting the obtained content item to the user based on the model and the bid amount associated with the obtained content item;
  determining, by the online system, an additional expected value to the online system based on the additional model and the average bid amount;
  including, by the online system, the obtained content item in association with the additional expected value in one or more selection processes selecting content for presentation to the user;
  modifying, by the online system, the model based on information received from the online system in response to the one or more selection processes selecting the obtained content item and the user performing the action associated with the obtained content item after being presented with the obtained content item;
  determining, by the online system, a rate of change of the expected value to the online system of presenting the obtained content item to the user over time; and
  responsive to a magnitude of the rate of change of the expected value to the online system of presenting the obtained content item to the user over time being less than a threshold value, providing, by the online system, a suggestion to a providing user associated with the obtained content item to increase the bid amount associated with the obtained content item.

2. The method of claim 1, further comprising:
responsive to the rate of change of the expected value to the online system of presenting the obtained content item to the user over time being negative, continuing modifying the model determining the likelihood of the user performing the action associated with the obtained content item after being presented with the obtained content item.

3. The method of claim 1, wherein responsive to the magnitude of the rate of change of the expected value to the online system of presenting the obtained content item to the user over time being less than a threshold rate, providing the suggestion to the providing user associated with the obtained content item to increase the bid amount associated with the obtained content item comprises:
  responsive to determining the magnitude of the rate of change of the expected value to the online system of presenting the obtained content item to the user over time is zero for at least a threshold amount of time, providing the suggestion to the providing user associated with the obtained content item to increase the bid amount associated with the obtained content item.

4. The method of claim 1, wherein the suggestion to the providing user includes a percentage increase for the bid amount.

5. The method of claim 1, wherein the obtained content item includes targeting criteria specifying characteristics of users eligible to be presented with the obtained content item.

6. The method of claim 5, wherein determining the set of users of the online system eligible to be presented with the obtained content item comprises:
  identifying users having characteristics satisfying at least a threshold amount of the targeting criteria.

7. The method of claim 6, wherein determining the average bid amount in response to users selecting links included in other content items presented to users of the set of users by the online system comprises:
  retrieving bid amounts in response to users selecting links included in other content items selected for presentation to identified users by the online system; and
  determining an average of the retrieved bid amounts.

8. A method comprising:
  obtaining, at an online system comprising at least one hardware processor, a content item associated with an action comprising an interaction with a page of content that is accessible after selection of a link included in the content item, the action occurring subsequent to presentation of the content item, and a bid amount specifying an amount of compensation received by the online system in response to the action being performed;
  determining, by the online system, a set of users of the online system eligible to be presented with the obtained content item;
  determining, by the online system, an average bid amount in response to users performing an alternative action from other content items presented to users of the set of users by the online system, the alternative action occurring more frequently than the action, each of the other content items being associated with corresponding bid amounts;
  for each opportunity to present the obtained content item to a user of the online system identified by the online system during a time interval:
    obtaining, by the online system, a model for determining a likelihood of the user performing the interaction with the page of content that is accessible after selection of the link included in the content item by the user after being presented with the obtained content item;
    obtaining, by the online system, an additional model for determining a likelihood of the user performing the alternative action after being presented with the obtained content item;
    determining, by the online system, an expected value to the online system of presenting the obtained content item to the user based on the model and the bid amount associated with the obtained content item;
    determining, by the online system, an additional expected value to the online system based on the additional model and the average bid amount;
    including, by the online system, the obtained content item in association with the additional expected value in one or more selection processes selecting content for presentation to the user;
    modifying, by the online system, the model based on information received from the online system in response to the one or more selection processes selecting the obtained content item and the user performing the action associated with the obtained content item after being presented with the obtained content item;

determining, by the online system, a rate of change of the expected value to the online system of presenting the obtained content item to the user over time; and
responsive to a magnitude of the rate of change of the expected value to the online system of presenting the obtained content item to the user over time being less than a threshold value, providing, by the online system, a suggestion to a providing user associated with the content item to increase the bid amount associated with the obtained content item.

9. The method of claim 8, wherein the alternative action comprises an action occurring more recently after presentation of the obtained content item than the action associated with the obtained content item.

10. The method of claim 9, wherein the action occurring more recently after presentation of the obtained content item than the action associated with the content item comprises the user accessing the obtained content item.

11. The method of claim 8, wherein the action comprises an action that has occurred less than a threshold number of times.

12. The method of claim 8, further comprising:
responsive to the rate of change of the expected value to the online system of presenting the obtained content item to the user over time being negative, continuing modifying the model determining the likelihood of the user performing the action associated with the obtained content item after being presented with the obtained content item.

13. The method of claim 8, wherein responsive to the magnitude of the rate of change of the expected value to the online system of presenting the obtained content item to the user over time being less than a threshold rate, providing the suggestion to the providing user associated with the obtained content item to increase the bid amount associated with the obtained content item comprises:
responsive to determining the magnitude of the rate of change of the expected value to the online system of presenting the obtained content item to the user over time is zero for at least a threshold amount of time, providing the suggestion to the providing user associated with the obtained content item to increase the bid amount associated with the obtained content item.

14. A computer program product comprising a non-transitory computer readable storage medium having instructions encoded thereon that, when executed by a processor, cause the processor to:
obtain, at an online system, a content item associated with a bid amount and with an action comprising an interaction with a page of content that is accessible after selection of a link included in the content item, the bid amount received by the online system in response to the action being performed;
determine a set of users of the online system eligible to be presented with the obtained content item;
determine an average bid amount in response to users selecting links included in other content items presented to users of the set of users by the online system, each of the other content items being associated with corresponding bid amounts;
for each opportunity to present the obtained content item to a user of the online system identified by the online system during a time interval:
obtain a model for determining a likelihood of the user performing the interaction with the page of content that is accessible after the user selects the link included in the obtained content item;
obtain an additional model for determining a likelihood of the user selecting the link included in the obtained content item;
determine an expected value to the online system of presenting the obtained content item to the user based on the model and the bid amount associated with the obtained content item;
determine an additional expected value to the online system based on the additional model and the average bid amount;
include the obtained content item in association with the additional expected value in one or more selection processes selecting content for presentation to the user;
modify the model based on information received from the online system in response to the one or more selection processes selecting the obtained content item and the user performing the action associated with the obtained content item after being presented with the obtained content item;
determine a rate of change of the expected value to the online system of presenting the obtained content item to the user over time; and
responsive to a magnitude of the rate of change of the expected value to the online system of presenting the obtained content item to the user over time being less than a threshold value, provide a suggestion to a providing user associated with the obtained content item to increase the bid amount associated with the obtained content item.

15. The computer program product of claim 14, wherein the computer readable storage medium further has instructions encoded thereon that, when executed by the processor, cause the processor to:
responsive to the rate of change of the expected value to the online system of presenting the obtained content item to the user over time being negative, continue modifying the model determining the likelihood of the user performing the action associated with the obtained content item after being presented with the obtained content item.

16. The computer program product of claim 14, wherein responsive to the magnitude of the rate of change of the expected value to the online system of presenting the obtained content item to the user over time being less than a threshold rate, provide the suggestion to the providing user associated with the obtained content item to increase the bid amount associated with the obtained content item comprises:
responsive to determining the magnitude of the rate of change of the expected value to the online system of presenting the obtained content item to the user over time is zero for at least a threshold amount of time, provide the suggestion to the providing user associated with the obtained content item to increase the bid amount associated with the obtained content item.

17. The computer program product of claim 14, wherein the suggestion to the providing user includes a percentage increase for the bid amount.

18. The computer program product of claim 14, wherein the obtained content item includes targeting criteria specifying characteristics of users eligible to be presented with the obtained content item.

19. The computer program product of claim 18, wherein determine the set of users of the online system eligible to be presented with the obtained content item comprises:
identify users having characteristics satisfying at least a threshold amount of the targeting criteria.

20. The computer program product of claim 18, wherein determine the average bid amount in response to users selecting links included in other content items presented to users of the set of users by the online system comprises:
retrieve bid amounts in response to users selecting links included in other content items selected for presentation to identified users by the online system; and
determining an average of the retrieved bid amounts.

* * * * *